May 21, 1963  B. L. FISHER ETAL  3,090,195
TEMPERATURE RESPONSIVE FUEL GOVERNING MEANS
Filed May 2, 1960  2 Sheets-Sheet 1
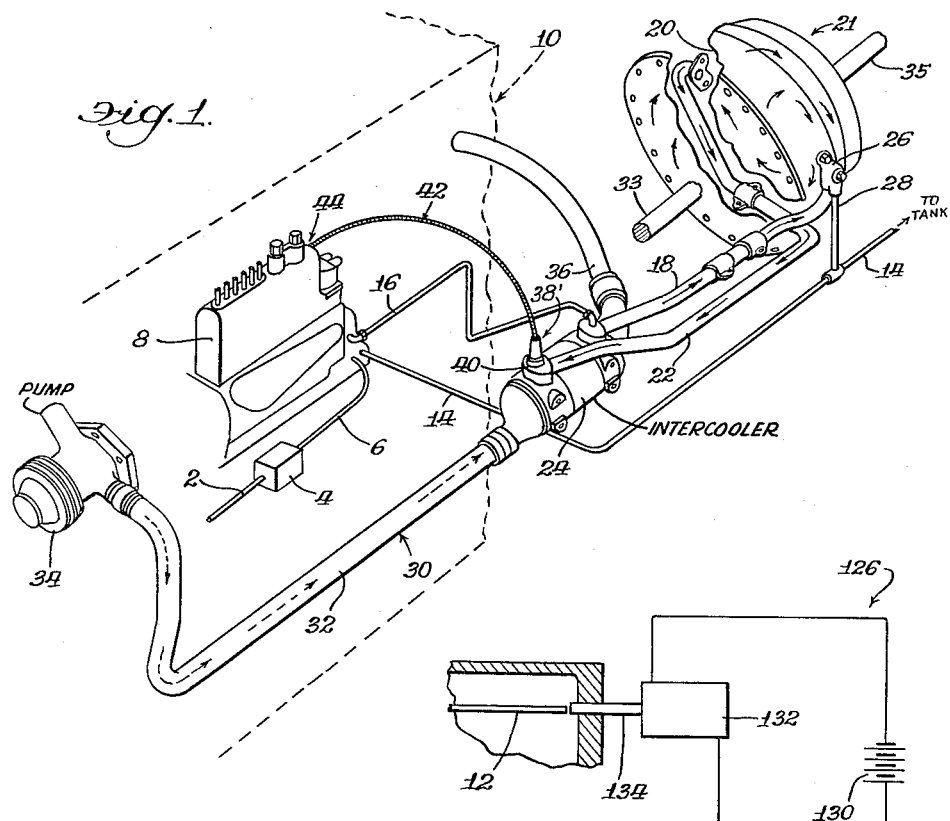
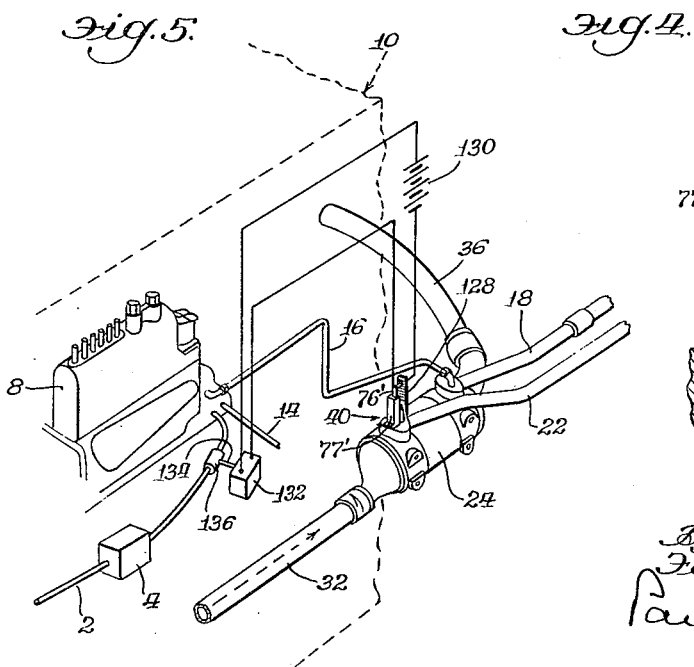
INVENTORS.
Byron L. Fisher
Forrest H. King
Paul O. Pippel
Atty.

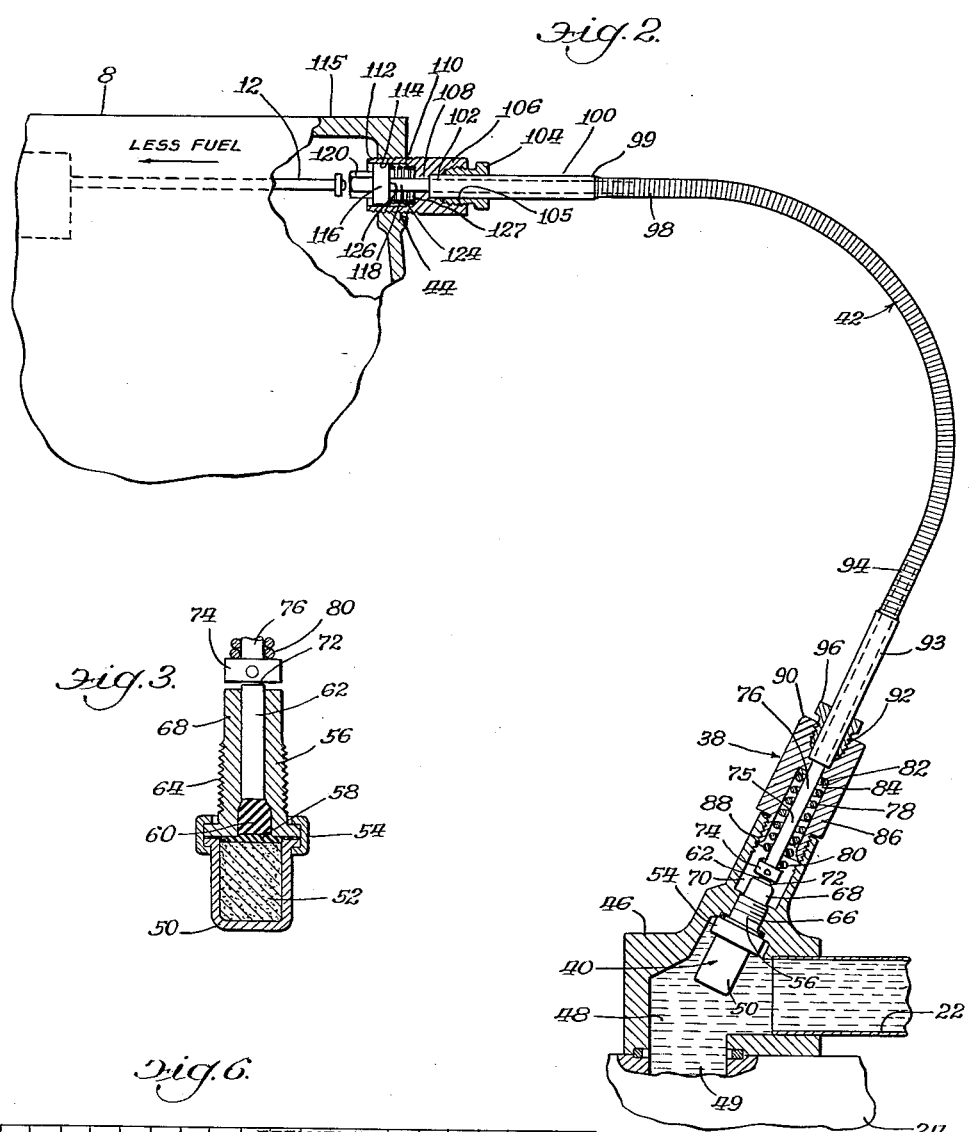

United States Patent Office 3,090,195
Patented May 21, 1963

3,090,195
TEMPERATURE RESPONSIVE FUEL GOVERNING MEANS
Byron L. Fisher, Clarendon Hills, and Forrest H. King, River Forest, Ill., assignors to International Harvester Company, Chicago, Ill., a corporation of New Jersey
Filed May 2, 1960, Ser. No. 26,079
1 Claim. (Cl. 60—12)

This invention relates to a sensing device to restrict the amount of fuel delivered to the internal combustion engine of a vehicle consequent upon inefficient operation of the vehicle power transmitting means and in particular relates to a thermal governor device for cutting back the amount of fuel delivered to the engine when the torque converter of the vehicle becomes unduly heated.

It is known that when the torque converter of the vehicle is subjected to light loads the speed of the output shaft of the torque converter tends to approach the speed of the input shaft of the torque converter and this results in a greater churning of the torque converter fluid causing excessive heating of the torque converter fluid. Therefore the output horsepower of the torque converter falls off relative to its input horsepower due to heat loss and the efficiency of the converter is thereby lowered. Heat losses are also encountered by overloading the torque converter unit and this also results in lowering the efficiency of the torque converter unit.

It is therefore an object of this invention to provide a governing means to adjust the amount of fuel delivered to the engine when inefficient operating conditions are encountered.

It is another object of this invention to reduce the amount of fuel delivered to the engine when the power transmitting means becomes overheated in order to have the power transmitting means operate in a more efficient range.

It is also an object of this invention to use a temperature sensing unit for reducing the amount of fuel to the engine when the temperature of the power transmitting means becomes unduly high.

It is a further object of this invention to provide a device for increasing the efficiency of the power transmitting means of a vehicle by reducing the amount of fuel consumption of the vehicle's engine.

A still further object of this invention is to provide a thermal governoring device for cutting back the amount of fuel delivered to the engine consequent upon overheating of the fluid of the torque converter of a vehicle.

A still further object is to provide a thermal governing device for sensing changes in temperature of the torque converter fluid and thereby controlling the fuel rack of the fuel injection pump in order to lessen the amount of fuel delivered to the engine upon overheating of the torque converter fluid.

These and other objects will become apparent from reference to the following description and accompanying drawings wherein:

FIGURE 1 is a schematic view showing the thermal governor mechanism connected between the torque converter cooler and the fuel injection system of a power plant;

FIGURE 2 is an enlarged view of the thermal governor mechanism shown in FIGURE 1;

FIGURE 3 is a cross sectional view of the thermal power element;

FIGURE 4 is a modification of the invention as shown in FIGURE 1;

FIGURE 5 is a further modification of the invention shown in FIGURE 4; and

FIGURE 6 is a chart showing the relationship between the speed ratio of the torque converter and the efficiency of the torque converter.

Referring now to FIGURE 1, there is shown a fuel line 2 carrying engine fuel from a reservoir or tank (not shown) to a filtering unit 4 and fuel line 6 into the fuel metering means or fuel injection pump unit 8 where the fuel is injected into an engine 10 on which the unit 8 is mounted. A fuel rack 12 (see FIGURE 2) controls the amount of fuel injected into the engine 10. All of the fuel sent into the fuel injection pump unit 8 is not used in the engine 10, but rather some of it is returned from the fuel intake means or the injection pump unit 8 through fuel line 14 and returned to the tank and some of the fuel is sent through line 16 into the torque converter inlet line 18 to be used as torque converter fluid 20 whence it passes out of the torque transfer mechanism torque converter 21 to line 22 to the torque converter intercooler 24 where it is cooled and returned through line 18 to the torque converter 21. Fluid may be drained from the converter 21 and pass through line 28 and 14 back to the tank.

The torque converter intercooler 24 which cools the torque converter fluid 20 receives its coolant 32 from the engine cooling system which has a conduit 30 connected to the engine coolant or water pump 34 for directing the coolant 32 through the inter-cooler 24 and out of the inter-cooler 24 through line 36 to the engine 10. The rest of the engine cooling system is not shown since it forms no part of this invention and is of the conventional type employed to cool internal combustion engines. The input shaft 33 and output shaft 35 of the converter 22 are shown diagrammatically.

The engine fuel and torque converter fluid system described above is also of the conventional type.

A thermal responsive means or governor mechanism 38 placed between the torque converter intercooler 24 and the fuel injection pump 8 consists of a thermostatic power element 40 on thermal couple, a cable unit 42 and a fuel rack actuating mechanism 44, as shown in FIGURES 1, 2 and 3. The thermostatic power element 40 is held in a housing 46 on the intercooler 24, the housing 46 having a fluid chamber 48 in communication with the torque converter fluid inlet line 22 and with the cooling passage 49 of the intercooler 24. The element 40 has a cup portion 50 projecting into the chamber 48 and containing a wax pellet 52 or other conventional thermal affected substance capable of expanding upon increase in temperature of the torque converter fluid 20 surrounding the cup 50 in the chamber 48 and a ring portion 54 which couples a piston sleeve portion 56 to the cup 50. A diaphragm 58 is above the wax pellet 52 and within the ring portion 54 and has a rubber plug 60 above it, the plug 60 being within the sleeve 56 and against this plug 60 and also within the sleeve portion 56 is a reciprocable piston 62. The sleeve 56 also has an external threaded portion 64 received in the internally threaded bore 66 of the housing 46 and an extension 68 projecting into the bore 70 of the housing 46, the piston 62 projecting slightly beyond the extension 68 and having its end 72 abutting against a collar 74 which is secured to the rod or flexible member 76 of the cable 42. The end portion 75 of the flexible member 76 is surrounded by a spring 78 which has its lower end 80 abutting against the collar 74 and has its upper end 82 abutting against internal bore 84 of jacket 86 which surrounds spring 78 and has its lower end portion 88 externally threaded and received into the internally threaded bore 70 of the housing 46. The outer end 90 of the jacket 86 has another bore 92 through which the member 76 passes and bore 92 is in communication with bore 84 and receives a tube portion 93 of a sheath 94 through which the rod 76 passes, the tube portion 93 being secured to nut 96 externally threaded into the bore 92 of the jacket 90. The sheath 94 of the cable 42 has its upper portion 98 fixed to one end 99 of the tube 100 and the flexible member 76 is connected to the tube 100. The other end 102 of the tube 100 has an externally threaded coupling member 104 integral with it, the member 104 being threaded into the threaded bore 105 of jacket 106 which has an opening 108 and an enlarged bore 110 through which the flexible member 76 passes. The end 112 of the jacket 106 in which the bore 110 is formed is externally threaded into an annular opening 114 in the fuel injection pump housing 115. A piston element 116 is integral with the end 118 of the flexible member 76 and reciprocates within the bore 112 and has an extension 120 projecting beyond the bore 112 for abutment with the fuel rack 12 of the fuel injection pump unit 8. A spring 124 between the inner face 126 of the piston element 116 and the face 127 of the bore 110 urges the piston element 116 outwardly of the jacket 106 in a direction toward the fuel injection pump rack 12.

When the temperature of the torque converter fluid rises above a certain value, say 220° F., due to overloading or light loading of the torque converter, the wax 52 in the power element 40 expands, moving piston 62 against collar 74 and against the action of the spring 84 causing the flexible member 76 of the cable 42 to push the piston head 116 against the fuel rack 2, moving the fuel rack to the left, i.e., in such a direction as to reduce the amount of fuel delivered by the fuel injection pump. This reduces the engine speed which correspondingly reduces the speed of the input shaft 33 of the torque converter. Reduction of the speed of the input shaft 33 reduces the agitation of the converter fluid 20 causing a fall in its temperature and consequently causing the contraction of the wax 52 permitting the flexible member 76 of the cable 42 to be urged by the spring 84 in a direction toward the power element 40.

The purpose of the spring 110 is to keep the cable 42 taut and thus sensitive to response of the thermal element 40.

Under this arrangement it is seen that an increase in temperature of the torque converter fluid 20 will cause a movement of the fuel rack 12 to reduce the amount of fuel and a corresponding decrease in temperature of the oil converter fluid will cause the fuel rack to move to the right to increase the amount of fuel delivered to the engine. The gradual expansion and contraction of the wax 52 permits a sensitive control over the amount of fuel delivered to the engine in response to increase and decrease of loads imposed on the torque converter 20.

FIGURE 4 is a modification of the invention wherein the cable 42 is replaced by an electrical circuit 126 consisting of a variable resistance 128, a battery 130 and a solenoid 132 in a series connection between the power element 40 and the fuel rack 12. The member 76' moves upwardly in guide block 77' due to the upward action of the piston 62 upon expansion of the wax 52 in the element 40 as the temperature of the torque converter fluid rises, as previously mentioned. As the temperature increases the resistance in the variable resistor 128 decreases, permitting a greater current to be sent to said solenoid 132 moving the plunger 134 against the fuel rack 12 causing the fuel rack 12 to move to a position of less fuel. The higher the temperature the lower the resistance in the circuit 126 and the greater the movement of the plunger 134 and the fuel rack 12 in the direction of less fuel. A decrease in temperature moves the member 76' downward increasing the resistance through the action of the variable resistance 128 and thereby moving the plunger 134 and the fuel rack 12 to a position of more fuel.

FIGURE 5 shows an embodiment similar to that shown in FIGURE 4 except that the plunger 134 actuates a conventional valve 136 in such a manner as to increase the restriction of fuel in the line 6 with an increase in torque converter fluid temperature thereby cutting down the amount of fuel delivered to the engine and to consequently decrease restriction of the fuel line 14 with decrease in converter fluid temperature.

Referring to FIGURE 6 there is shown a graph in which the speed ratio or the ratio of the output speed of the torque converter to the input speed of the torque converter (which speed is equivalent to the output speed of the engine) is plotted against the percent efficiency of the torque converter. The percent efficiency of the torque converter is determined by dividing the measured output horsepower of the torque converter by the measured input horsepower of the torque converter and multiplying by 100. As the speed ratio increases toward the value of 1, i.e., as the speed of the output shaft increases from zero relative to the input speed of the torque converter, the percent efficiency of the torque converter increases and reaches an approximate maximum value of 82% when the speed ratio is about .5. When the speed ratio increases beyond .5 then the percent efficiency of the torque converter declines.

When the engine is started the speed of the input shaft 33 of the converter 21 continues until it reaches a value as determined by the engine governor and consequently the output speed of the converter is developed. When the speed of the output shaft 35 reaches a speed that is approximately half of the input shaft the maximum efficiency of the converter 21 is reached and only 82% of the horsepower of the input shaft 33 is used in operating the converter and the rest is lost in the form of heat. An efficient operating range for the converter 21 is when the speed ratio is between .225 and .775, i.e., when efficiency of the converter 21 is between 70% and 82%.

If the output shaft speed of the converter 21 decreases due to a sufficient increase of load causing the efficiency to drop below 70%, the temperature of the torque converter fluid may exceed 220° F. This may occur when the speed ratio is less than .225 and is because the input shaft 33 is churning the fluid but the output shaft 35 is not responding sufficiently to the action of the torque converter 21 because of a load imposed on the output shaft 35 and the result is an increase in the temperature of the converter fluid 20.

If the output shaft speed of the converter 21 increases due to a sufficient decrease in load causing the efficiency again to drop below 70%, the temperature of the torque converter 21 also may exceed 220° F. This may occur when the speed ratio is greater than .775 and is because output shaft 35 having a lighter load resistance, attains or attempts to attain a speed approaching the input shaft speed causing such a rapid transfer of a greater quantity fluid in a given time through the elements of the converter 21 as to produce such heat to cause the temperature of the fluid 20 to rise above 220° F.

The particular speed ratio values and the efficiency range values illustrated above represent the operating characteristics of a particular torque converter and are shown to illustrate the overheating of torque converters in general due to underloading and overloading and are in no way meant to be a limitation of the invention or the scope of the appended claim.

The thermal governor 38 senses the increase of temperature of the converter fluid 20 and reduces the amount of fuel causing the input speed of the torque converter 21 to fall. This cuts down the action of the converter 21 and consequently the heat loss is reduced. The efficiency of the torque converter is thereby increased by using less fuel under an overload condition, though the converter efficiency will be lessened as shown by FIGURE 6 where the speed ratio moves farther to the right on the curve because of the action of the thermal governor 38 and the converter will operate in a cooler range since its action has been reduced by the use of less fuel. Also the overall engine coolant temperature tends to remain lower since the temperature of the torque converter fluid is reduced or kept down by the action of the thermal governor. Where the overheating is due to light loading a decrease in fuel by the action of the thermal governor 38 results in the torque converter 21 operating with the efficient range of 70% to 82%. Referring to the curve of FIGURE 4 it is seen that a reduction in fuel causes the speed ratio to move to the left on the curve putting the converter in the efficiency range of 70% to 82%. Though less horsepower is developed it is used more efficiently and at the same time fuel consumption is reduced. Also, as was the case with the overload condition, the temperature of the converter 21 and its fluid 20 as well as the temperature of the engine and the engine coolant is lowered due to fuel reduction by action of the thermal governor 38 with the result that the parts of the converter 21 and the engine are less likely to be damaged because of overheating.

It is to be understood that the invention need not be necessarily limited to a thermal governor device but rather other governor devices such as a pressure governor device may be used to vary the amount of fuel in response to changes in pressure of fluid medium affected by the torque converter.

What is claimed is:

In a power plant, an engine being supplied with a fuel, a torque converter containing a fluid, an engine cooling system, a heat exchange between the torque converter fluid and the engine cooling system, a thermal couple responsive to the temperature of the torque converter fluid operatively associated with the engine fuel control through linkage means, the linkage means comprising a flexible link having opposed end portions, and centering means including a first resilient means disposed between one end portion of the link and the fuel control and urging the link to engagement with the fuel control means and second resilient means disposed between the other end portion of the link and the thermal couple and urging the link to engagement with the thermal couple and away from the fuel control with a force opposing the force of the first resilient means, the thermal couple having means movably engaging the other portion and moving the link from a centered position and against the force of the second resilient means to decrease the fuel supplied by moving the fuel control to the engine upon increase in temperature of the fluid beyond an efficient heating range of the torque converter.

References Cited in the file of this patent

UNITED STATES PATENTS

| 2,699,642 | Ahlen | Jan. 18, 1955 |
| 2,796,239 | Holmes et al. | June 18, 1957 |

FOREIGN PATENTS

| 439,096 | Germany | Jan. 3, 1927 |
| 883,567 | Germany | July 20, 1953 |
| 56,286 | Netherlands | May 15, 1944 |